J. C. MUTTI.
BAND BRAKE.
APPLICATION FILED JUNE 15, 1915.
1,183,899.
Patented May 23, 1916.
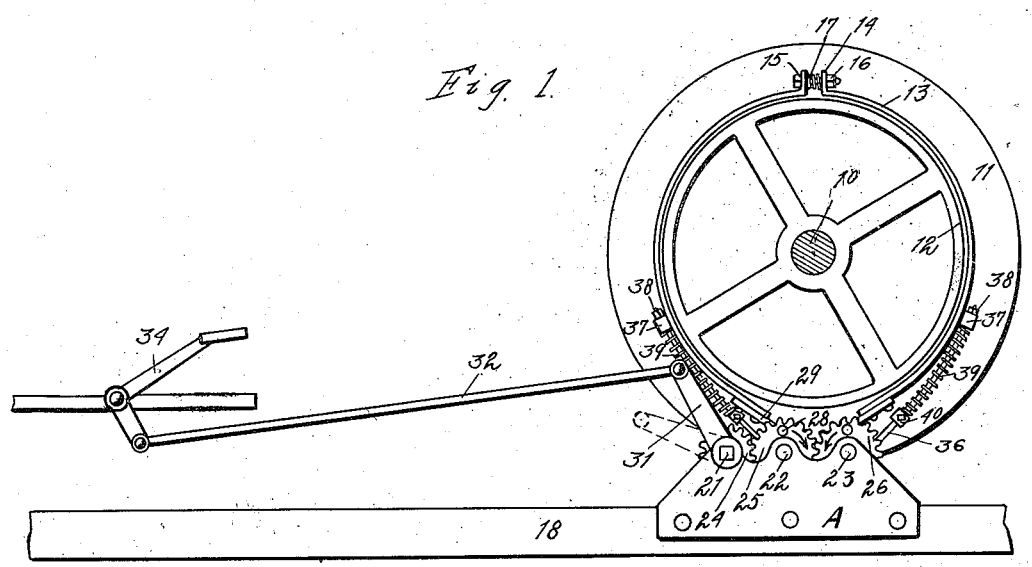
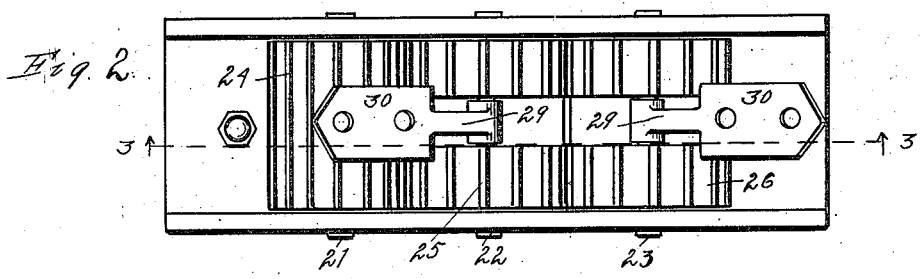
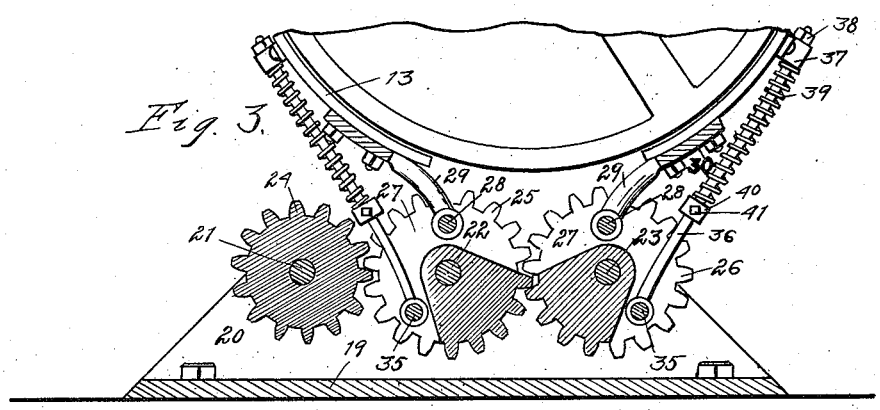
Witnesses.
Inventor
Jacob C. Mutti

UNITED STATES PATENT OFFICE.

JACOB C. MUTTI, OF MANSON, IOWA.

BAND-BRAKE.

1,183,899.

Specification of Letters Patent.

Patented May 23, 1916.

Application filed June 15, 1915. Serial No. 34,295.

*To all whom it may concern:*

Be it known that I, JACOB C. MUTTI, a citizen of the United States, and resident of Manson, in the county of Calhoun and State of Iowa, have invented a certain new and useful Band-Brake, of which the following is a specification.

The object of my invention is to provide a band brake of simple, durable and inexpensive construction.

A further object is to provide a brake of the general type mentioned particularly adapted for use on large and heavy machinery such as dredges, ditchers, excavating machinery and the like having controlling means whereby both ends of the band brake may be simultaneously operated for loosening or tightening the brake.

Still a further object is to provide in such a brake means for automatically releasing the brake upon the releasing the holding means, said means being also adapted to guide, steady and control the band brake.

My invention consists in the construction, arrangement and combination of the various parts of the device whereby the objects contemplated are attained as hereinafter more fully set forth pointed out in my claims and illustrated in the accompanying drawings, in which:

Figure 1 shows a side elevation of a brake embodying my invention. Fig. 2 shows a top or plan view of the operating mechanism, the resilient band and drum not being shown, and Fig. 3 shows a vertical sectional view taken on the line 3—3 of Fig. 2.

It is well known that where it is necessary to have a band brake of large diameter that ordinarily only one end of the brake is detachable, so that even when the brake is loosened there is some friction between the band and the wheel or the like on which it travels. I have built a brake both ends of which are controlled for releasing the resilient band around its entire circumference when the brake is released.

In the exemplification of my invention, illustrated in the accompanying drawings, I have used the reference numeral 10 to indicate generally a shaft upon which is mounted a large drum 11, which may be used for a variety of purposes on heavy machinery. At one end of the drum 11 is a wheel or flange 12 adapted to be engaged by the resilient band hereinafter referred to.

Surrounding the wheel or flange 12 is a resilient band preferably made in two parts 13 having at their upper portions the opposite upward extensions 14 secured together by means of a bolt 15 and a nut 16 and yieldingly held apart by a spring 17 mounted on the bolt 15 between the extensions 15.

Suitably mounted on the frame 18 of the large machine is a casting or support A, which is preferably channel shaped having a bottom member 19 and spaced opposite side members 20. Suitably mounted in bearings formed or mounted on the side members 20, are three shafts 21, 22 and 23 spaced apart from each other as shown in the drawings.

Mounted on the shaft 21 and fixed thereto is a comparatively wide toothed gear wheel 24 in mesh with a similar toothed gear wheel 25 on the shaft 22. The gear wheel 25 meshes with a similar gear wheel 26 on the shaft 23. The gear 24 is preferably smaller than the gears 24 and 26.

The gears 25 and 26 are provided with slots 27 for the purpose hereinafter made clear. Extending across the slots 27 are pins or shafts 28, clearly shown in Fig. 3. Mounted on the pins or shafts 28 are upwardly extending bars 29, on the upper ends of which are wider substantially flat members 30, to which the lower ends of the resilient band members 13 are bolted, as shown in Figs. 1 and 3.

The outer end of the shaft 21 is angular, as shown in Fig. 1, and on it is slidably mounted an arm 31. Pivoted to the arm 31 is a link 32 which extends away from the casting A to a suitable point in the machine for locating a foot lever 34, one end of which is pivoted to said link 32, as shown in Fig. 1.

The slots 27 are comparatively narrow, but are of such size circumferentially of the gears 25 and 26 as to permit sufficient play of the members 29.

Mounted between the walls or parts of the gears 25 and 26 are pins or shafts 35, on which are pivotally mounted upwardly extending rods 36. The rods 36 extend upwardly outside the resilient band members 13 and are slidably extended through detachable bearings 37 on said band members. On the upper ends of the rods 36, above the bearings 37, are nuts 38, which can be screwed to different positions on the rods 36 for varying the tensions of the springs 39, or 110 for adjusting the machine for limiting the movement of the band brake. On the rods 36 below the bearings 37 are collars 40, which are detachably mounted on the rods 36 by means of set screws 41. Between the collars 40 and bearings 37 are coil springs 39. The pins or shafts 35 are so located and the coil springs 39 are of such kind and are so located as to force the gears 35 and 36 to the position shown in Fig. 3 with the band brake held upwardly and away from the wheel or flange 12. For tightening the band brake, the shaft 21 is properly rotated as for instance by means of the foot lever 34 for rotating the gears 25 and 26 toward each other, thereby drawing the pins or shafts 28 downwardly and inwardly and tightening the band brake 12 on the wheel or flange 12 against the pressure of the springs 39. The rods 36 during said movement slide upwardly and through the bearings and serve to steady the band brake and members 13, and to hold them in proper position.

It will readily be seen that upon releasing the pressure of the lever 34, the springs 39 will force the band brake members upwardly and away from the flange or wheel 12 and will tend to rotate the gears 25 and 26 over part of a revolution, so that the band brake is not only automatically released when the pressure of the foot lever is released, but is automatically held in frictional engagement with the wheel or flange 12.

It will be understood that some changes may be made in the construction and arrangement of the parts of my improved band brake without departing from its essential features and purposes, and it is my intent to cover by this application any such changes which may be included within the scope of my claims.

I claim as my invention—

1. In a band brake, the combination of a rotating member with a resilient two part band, means for yieldingly connecting two adjacent ends of the band together, a pair of meshing gears, the other ends of the band being pivoted off center to the respective gears, a lever, means for operatively connecting said lever with one of said gears, and yielding devices mounted on the respective gears and operatively connected with opposite sides of the band.

2. In a band brake, the combination of a rotating member with a resilient two part band, means for yieldingly connecting two adjacent ends of the band together, a pair of meshing gears having slots in their peripheries, transverse shafts mounted in said gears extending across said slots, bars pivoted on said shafts extending away from said gears, having flat upper portions to which the other ends of said band are secured and means for rotating one of said gears.

3. In a device of the class described, the combination of a rotating member with a band brake comprising a resilient band, a pair of meshing gears having slots in their peripheries, transverse shafts mounted in said gears extending across said slots, bars pivoted on said shafts extending away from said gears, having flat upper portions to which the said band is secured and means for rotating one of said gears.

4. In a device of the class described, the combination of a rotating member with a band brake comprising a resilient band, a pair of meshing gears, the ends of said band being pivoted off center to the respective gears, a third gear in mesh with one of said first gears, and a lever operatively connected with said last gear for imparting motion thereto.

5. In a device of the class described, the combination of a rotating member with a band brake comprising a resilient band, a pair of meshing gears, the ends of said band being pivoted off center to the respective gears, means for imparting rotation to said gears, rods pivotally mounted off center on the respective gears and slidably mounted on said band on opposite sides of said rotating member, and yielding devices on said rods tending to hold said band away from said rotating member.

Des Moines, Iowa, June 8, 1915.

JACOB C. MUTTI.

Witnesses:
J. MAHER,
A. SHERMAN.